United States Patent
Ohno et al.

(10) Patent No.: US 7,666,240 B2
(45) Date of Patent: Feb. 23, 2010

(54) HONEYCOMB FILTER

(75) Inventors: Kazushige Ohno, Ibi-gun (JP); Masafumi Kunieda, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 351 days.

(21) Appl. No.: 11/873,204

(22) Filed: Oct. 16, 2007

(65) Prior Publication Data
US 2008/0202086 A1    Aug. 28, 2008

(30) Foreign Application Priority Data
Feb. 28, 2007    (JP) ............... PCT/JP2007/053769

(51) Int. Cl.
| B01D 46/00 | (2006.01) |
| B01D 39/14 | (2006.01) |
| B01D 39/06 | (2006.01) |
| B01D 50/00 | (2006.01) |
| F01N 3/10  | (2006.01) |
| F01N 3/08  | (2006.01) |
| F01N 3/00  | (2006.01) |
| B01J 23/00 | (2006.01) |

(52) U.S. Cl. .................... 55/523; 55/522; 55/524; 422/172; 422/173; 422/174; 422/175; 422/176; 422/177; 422/178; 422/179; 422/180; 502/303; 60/297

(58) Field of Classification Search ........... 55/522–524; 60/297; 422/172–180; 502/303
See application file for complete search history.

(56) References Cited

U.S. PATENT DOCUMENTS

| 5,914,187 | A  | 6/1999  | Naruse et al. |
| 5,952,079 | A  | 9/1999  | Andou et al.  |
| 6,669,751 | B1 | 12/2003 | Ohno et al.   |
| 7,112,233 | B2 | 9/2006  | Ohno et al.   |
| 7,309,370 | B2 | 12/2007 | Kudo et al.   |
| 2004/0123573 | A1 | 7/2004 | Ichikawa et al. |
| 2004/0134173 | A1 | 7/2004 | Bardon |

(Continued)

FOREIGN PATENT DOCUMENTS

EP    1142619    10/2001

(Continued)

OTHER PUBLICATIONS

U.S. Appl. No. 11/760,037.

(Continued)

*Primary Examiner*—Walter D Griffin
*Assistant Examiner*—Amber Orlando
(74) *Attorney, Agent, or Firm*—Ditthavong Mori & Steiner, P.C.

(57) ABSTRACT

A honeycomb filter includes a plurality of honeycomb fired bodies each having a longitudinal direction and a plurality of cells which are divided by cell walls and which extend in the longitudinal direction in substantially parallel with each other, each of the cells having one end sealed; and an adhesive material binding the plurality of honeycomb fired bodies. The plurality of honeycomb fired bodies includes outer peripheral honeycomb fired bodies each having a first outer wall and positioned at an outermost periphery of the honeycomb filter; and inner honeycomb fired bodies surrounded by the outer peripheral honeycomb fired bodies. Each of the inner honeycomb fired bodies has a second outer wall thinner than the first outer wall.

9 Claims, 6 Drawing Sheets

U.S. PATENT DOCUMENTS

| | | |
|---|---|---|
| 2004/0142145 A1 | 7/2004 | Hashimoto et al. |
| 2004/0161596 A1 | 8/2004 | Taoka et al. |
| 2005/0076626 A1 | 4/2005 | Kudo et al. |
| 2005/0109023 A1 | 5/2005 | Kudo et al. |
| 2005/0153099 A1 | 7/2005 | Yamada |
| 2005/0160710 A1 | 7/2005 | Taoka et al. |
| 2005/0161849 A1 | 7/2005 | Ohno et al. |
| 2005/0169819 A1 | 8/2005 | Shibata |
| 2005/0175514 A1 | 8/2005 | Ohno |
| 2005/0178098 A1 | 8/2005 | Ono et al. |
| 2005/0180898 A1 | 8/2005 | Yamada |
| 2005/0214503 A1 | 9/2005 | Sakamoto |
| 2005/0229565 A1 | 10/2005 | Yoshida |
| 2005/0247038 A1 | 11/2005 | Takahashi |
| 2005/0272602 A1 | 12/2005 | Ninomiya |
| 2006/0154021 A1 | 7/2006 | Ohno et al. |
| 2006/0166820 A1 | 7/2006 | Ogyu et al. |
| 2006/0210765 A1 | 9/2006 | Ohno et al. |
| 2006/0213163 A1 | 9/2006 | Taoka et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0228521 A1 | 10/2006 | Ohno et al. |
| 2006/0230732 A1 | 10/2006 | Kunieda |
| 2006/0254231 A1 | 11/2006 | Hayashi et al. |
| 2007/0009707 A1 | 1/2007 | Ogura et al. |
| 2007/0020155 A1 | 1/2007 | Ohno et al. |
| 2007/0044444 A1 | 3/2007 | Oshimi |
| 2007/0068128 A1 | 3/2007 | Oshimi et al. |
| 2007/0116908 A1 | 5/2007 | Ohno et al. |
| 2007/0126160 A1 | 6/2007 | Takahashi |
| 2007/0128405 A1 | 6/2007 | Sakaguchi et al. |
| 2007/0130897 A1 | 6/2007 | Sakaguchi et al. |
| 2007/0169453 A1 | 7/2007 | Hayakawa |
| 2007/0190289 A1 | 8/2007 | Fujita |
| 2007/0190350 A1 | 8/2007 | Ohno et al. |
| 2007/0293392 A1 | 12/2007 | Ohno et al. |
| 2008/0202087 A1 | 8/2008 | Ohno et al. |
| 2008/0203626 A1 | 8/2008 | Ohno et al. |
| 2008/0236394 A1 | 10/2008 | Ohno et al. |
| 2008/0237941 A1 | 10/2008 | Ohno et al. |
| 2008/0241501 A1 | 10/2008 | Ohno et al. |
| 2008/0286523 A1 | 11/2008 | Ohno et al. |

FOREIGN PATENT DOCUMENTS

| | | |
|---|---|---|
| JP | 2002-326035 | 11/2002 |
| JP | 2003-275522 | 9/2003 |
| JP | 2003-340224 | 12/2003 |
| JP | 2004-524477 | 8/2004 |
| JP | 2006-007100 | 1/2006 |
| JP | 2007-014886 | 1/2007 |
| WO | WO 98/05602 | 2/1998 |
| WO | WO 2003/002231 | 1/2003 |

OTHER PUBLICATIONS

U.S. Appl. No. 11/873,204.

A-A line cross-sectional view

HONEYCOMB FILTER

CROSS-REFERENCE TO RELATED APPLICATIONS

The present application claims priority under 35 U.S.C. §119 to PCT Application No. PCT/JP2007/053769, filed Feb. 28, 2007 and entitled "HONEYCOMB FILTER." The contents of this application are incorporated herein by reference in their entirety.

BACKGROUND OF THE INVENTION

1. Field of the Invention

The present invention relates to a honeycomb filter.

2. Discussion of the Background

In recent years, it has become a serious issue that particulate matter (hereinafter, referred to simply as particulate) contained in an exhaust gas discharged from internal combustion engines of vehicles such as buses and trucks and construction machines causes harmful effects on the environment and human being.

Therefore, various kinds of honeycomb filters made of porous ceramics have been proposed as a filter for capturing the particulate contained in an exhaust gas and thereby purifying the exhaust gas.

FIG. 3 is a perspective view schematically showing one example of a conventional honeycomb filter of this kind, FIG. 4(a) is a perspective view schematically showing a honeycomb fired body constituting the honeycomb filter, and FIG. 4(b) is a cross-sectional view along the line A-A of FIG. 4(a).

In the honeycomb filter of this kind, as exemplified by a conventional honeycomb filter 70 shown in FIG. 3, a plurality of honeycomb fired bodies 80 comprising silicon carbide and the like are bonded to each other by interposing an adhesive material layer 72 to compose a ceramic block 71, and a coat layer 73 is formed around the ceramic block 71.

In each of the conventional honeycomb fired bodies 80, as shown in FIGS. 4(a) and 4(b), a large number of cells 81 are longitudinally placed in parallel with one another and cell walls 83 partitioning the cells 81 from one another work as a filter. In other words, each of the cells 81 formed in the honeycomb fired bodies 80 is sealed with plugs 82 in one of the end parts in an inlet side or an outlet side of the exhaust gas as shown in FIG. 4(b) so that the exhaust gas introduced into one cell 81 is flow out of another cell 81 after surely passing through the cell wall 83 partitioning the cells 81.

In an exhaust gas purifying apparatus, the honeycomb filter 70 with the above-mentioned configuration is installed in an exhaust path of the internal combustion engine, and the particulate contained in the exhaust gas discharged from the internal combustion engine is captured by the cell wall 83 while passing through the honeycomb filter 70 so that the exhaust gas is purified.

As an example of a honeycomb filter, WO 2003/002231 A1 discloses a honeycomb filter formed by integrating a plurality of honeycomb segments with a honeycomb structure having a large number of communication holes, in which a heat capacity per unit volume of the honeycomb segment in the outer peripheral part is higher than that of the honeycomb segment in the center part. The contents of WO 2003/002231 A1 are incorporated herein by reference in their entirety.

SUMMARY OF THE INVENTION

The honeycomb filter of the present invention includes a plurality of honeycomb fired bodies each having a longitudinal direction and a plurality of cells which are divided by cell walls and which extend in the longitudinal direction in substantially parallel with each other, each of the cells having one end sealed; and an adhesive material binding the plurality of honeycomb fired bodies. The plurality of honeycomb fired bodies includes outer peripheral honeycomb fired bodies each having a first outer wall and positioned at an outermost periphery of the honeycomb filter; and inner honeycomb fired bodies surrounded by the outer peripheral honeycomb fired bodies. Each of the inner honeycomb fired bodies has a second outer wall thinner than the first outer wall.

The thickness of the second outer wall of each of the inner honeycomb fired bodies is desirably equal to or more than the thickness of a cell wall inside the inner honeycomb fired body. Moreover, all of the first outer walls of the outer peripheral honeycomb fired bodies are desirably thicker than the second outer walls of the inner honeycomb fired bodies.

A ratio of the thickness of the first outer wall to the thickness of the second outer wall is desirably in a range from about 1.05 to about 2.0. Moreover, the thickness of the first outer wall is desirably in a range from about 0.25 to about 0.50 mm.

Furthermore, a ratio of the thickness of the second outer wall to the thickness of the cell walls is desirably in a range from about 1.0 to about 2.0.

A thickness of the second outer wall is desirably in a range from about 0.20 to about 0.45 mm.

The first outer walls desirably have a substantially uniform thickness.

A ratio of a cross-sectional area of the outer peripheral honeycomb fired bodies to a cross-sectional area of the honeycomb filter in a cross section perpendicular to the longitudinal direction is desirably in a range from about 20% to about 60%.

BRIEF DESCRIPTION OF THE DRAWINGS

A more complete appreciation of the invention and many of the attendant advantages thereof will be easily obtained as the same becomes better understood by reference to the following detailed description when considered in connection with the accompanying drawings.

DESCRIPTION OF THE EMBODIMENTS

Figure 1:
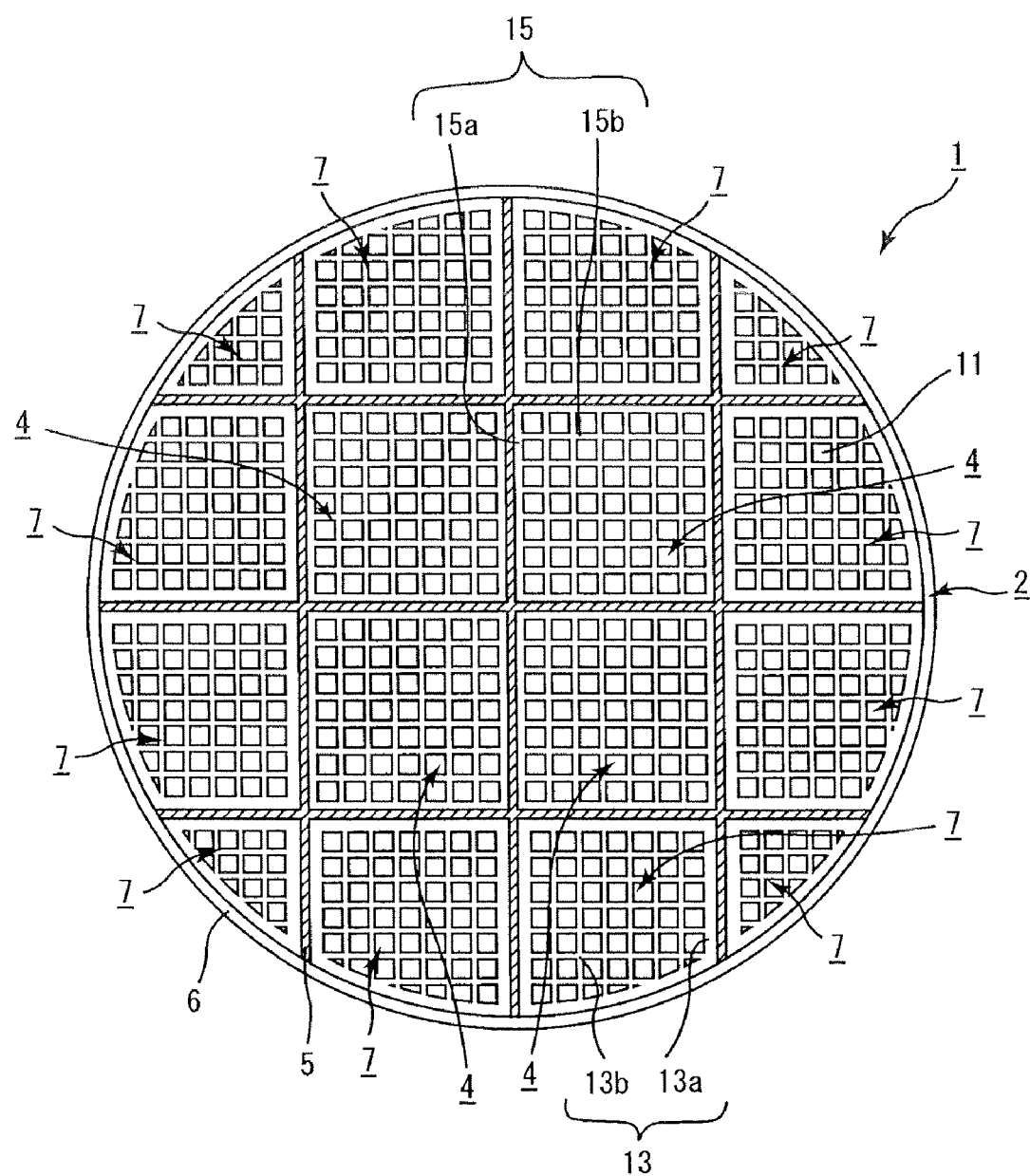
FIG. 1 is a front view schematically showing a cross-sectional view perpendicular to the longitudinal direction of a honeycomb filter according to the embodiment of the present invention.

The embodiments will now be described with reference to the accompanying drawings, wherein like reference numerals designate corresponding or identical elements throughout the various drawings.

The honeycomb filter according to the embodiment of the present invention is a honeycomb filter formed by binding, by interposing an adhesive material layer, a plurality of pillar-shaped honeycomb fired bodies each having a large number of cells longitudinally placed in parallel with one another with a cell wall therebetween, each of the cells having one end sealed. The plurality of honeycomb fired bodies include an outer peripheral honeycomb fired body positioned at the outermost periphery; and an inner honeycomb fired body each having side faces thereof all contacting other honeycomb fired bodies, and an outer wall (a first outer wall) of the outer peripheral honeycomb fired body is thicker than an outer wall (a second outer wall) of the inner honeycomb fired body.

With respect to the honeycomb filter according to the embodiment of the present invention, the flow of the exhaust gas is controlled so that the exhaust gas hardly flows in the outer peripheral part of the honeycomb filter, and at the same time much exhaust gas flows in the inner part of the honeycomb filter in such a manner that the outer walls of the outer peripheral honeycomb fired bodies positioned at the outermost periphery of the honeycomb filter are made thicker than the outer walls of the inner honeycomb fired bodies so that the aperture ratio of each of the outer peripheral honeycomb fired bodies (a ratio of an area occupied by the cell openings at the end of each honeycomb fired body to the whole area) is decreased. By the aforementioned exhaust gas flow control, it becomes easier to deposit a larger amount of the particulate in the inner part where the temperature becomes higher than the outer peripheral part so that the particulate may easily be burned and removed there. Further, the heat generated in the inner part by the combustion of the particulate may efficiently be utilized in the outer peripheral part. Accordingly, in the honeycomb filter according to the embodiment of the present invention, the particulate combustion may efficiency be improved in the whole honeycomb filter including the outer peripheral part and the inner part.

Further, since the outer walls of the outer peripheral honeycomb fired bodies positioned at the outermost periphery of the honeycomb filter according to the embodiment of the present invention are thicker than the outer walls of the inner honeycomb fired bodies, the mechanical strength of the honeycomb fired bodies tends to be improved. Accordingly, the honeycomb filter according to the embodiment of the present invention may easily be provided with excellent durability against vibration and heat impact from the outside and the like at the time of use.

In the present specification, the shape indicated by the word "pillar" refers to any desired shape of a pillar including a round pillar, an oval pillar, a polygonal pillar and the like.

The plurality of honeycomb fired bodies composing the honeycomb filter according to the embodiment of the present invention include the outer peripheral honeycomb fired bodies and the inner honeycomb fired bodies. Further, the outer peripheral honeycomb fired bodies include an equal-thickness honeycomb fired body in which the thickness of the outer wall and the thickness of the inner cell wall are respectively equal to those of the inner honeycomb fired bodies, and an thick-wall honeycomb fired body in which the thickness of the outer wall is more than that of the inner honeycomb fired bodies. Hereinafter, in this specification, the respective honeycomb fired bodies will be referred to as the aforementioned respective terms, and also in the case of referring to simply as honeycomb fired bodies, the term "the honeycomb fired bodies" is employed as a conceptual term including the outer peripheral honeycomb fired bodies, equal-thickness honeycomb fired bodies, thick-wall honeycomb fired bodies, and inner honeycomb fired bodies. These honeycomb fired bodies are classified as shown in Table 1.

TABLE 1

Honeycomb fired body
- Outer peripheral honeycomb fired body
  - Equal thickness honeycomb fired body
  - Thick-wall honeycomb fired body
- Inner honeycomb fired body With respect to the honeycomb filter according to the embodiment of the present invention, the outer peripheral honeycomb fired body positioned at the outermost periphery of the honeycomb filter is the thick-wall honeycomb fired body having outer walls all thicker than the outer walls of the inner honeycomb fired bodies each having side faces all contacting other honeycomb fired bodies.

The embodiments of the present invention will be further described with reference to drawings. FIG. 1 is a front view schematically showing a cross-sectional view perpendicular to the longitudinal direction of the honeycomb filter according to the embodiment of the present invention.

As shown in FIG. 1, honeycomb fired bodies composing a honeycomb filter 1 according to the embodiment of the present invention can be classified into the outer peripheral honeycomb fired bodies 7 positioned at the outermost periphery and the inner honeycomb fired bodies 4 each having side faces all contacting other honeycomb fired bodies. In the case where the honeycomb fired bodies are thus classified, the honeycomb filter 1 shown in FIG. 1 includes four pieces of the inner honeycomb fired bodies 4 and twelve pieces of the outer peripheral honeycomb fired bodies 7.

In this specification, the inner part of the honeycomb filter means the portion occupied by the inner honeycomb fired bodies in the entire honeycomb filter (e.g. a portion occupied by the inner honeycomb fired bodies 4 in FIG. 1 and the like), and the outer peripheral part of the honeycomb filter means the portion occupied by the outer peripheral honeycomb fired bodies in the entire honeycomb filter (e.g. the portion occupied by the outer peripheral honeycomb fired bodies 7 in FIG. 1 and the like).

In the honeycomb filter 1 shown in FIG. 1, outer walls 13a of the outer peripheral honeycomb fired bodies 7 are thicker than outer walls 15a of the inner honeycomb fired bodies 4. That is, the outer peripheral honeycomb fired bodies 7 in this example correspond to the thick-wall honeycomb fired bodies as defined in the present application. Accordingly, for convenience of explanation, in the embodiment shown in FIG. 1, the honeycomb fired bodies positioned in the outermost periphery are called the outer peripheral honeycomb fired bodies 7 as well as the thick-wall honeycomb fired bodies 7.

The thickness of the outer walls of the outer peripheral honeycomb fired bodies (thick-wall honeycomb fired bodies) is not particularly limited as long as it is thicker than the thickness of the outer walls of the inner honeycomb fired bodies; however, the ratio of the thickness (a) of the outer walls of the thick-wall honeycomb fired bodies to the thickness (b) of the outer walls of the inner honeycomb fired bodies (ratio (a/b) of outer wall thickness) is desirably in a range from about 1.05 to about 2.0.

When the ratio (a/b) of outer wall thickness is about 1.05 or more, the effect of the control of the exhaust gas flow for accumulating a larger amount of particulate at the inner part of the honeycomb filter may easily be obtained. On the other hand, when the ratio of outer wall thickness is about 2.0 or less, the surface area of the cells capable of capturing particulate is unlikely to be decreased, and the amount of captured particulate (accumulation amount) of the particulate itself is unlikely to be decreased. This may substantially prevent decrease of exhaust gas purifying efficiency of the honeycomb filter.

The thickness of the outer walls of the thick-wall honeycomb fired bodies is desirably in a range from about 0.25 to about 0.50 mm.

When the thickness of the outer walls is about 0.25 mm or more, the effect of accumulating a larger amount of particulate at the inner part of the honeycomb filter may easily be obtained. On the other hand, when the thickness of the outer walls is about 0.50 mm or less, the surface area of the cells capable of capturing particulate is unlikely to be decreased, and the amount of captured particulate (accumulation amount) of the particulate itself is unlikely to be decreased. This may substantially prevent decrease of the exhaust gas purifying efficiency of the honeycomb filter.

The thickness of the outer walls of the inner honeycomb fired bodies is desirably equal to or more than the thickness of cell walls of the inner honeycomb fired bodies.

That is because, in the inner honeycomb fired bodies composing the honeycomb filter according to the embodiment of the present invention, if the thickness of the outer walls is larger than that of the cell walls in the inner part, the strength of the inner honeycomb fired bodies itself is unlikely to be reduced and the durability against external impact such as vibration, thermal impact generated at the time of use is unlikely to be decreased.

In the inner honeycomb fired bodies, the ratio of the thickness (b) of the outer walls to the thickness (t) of the cell walls in the inner part (ratio (b/t) of cell wall thickness) is not particularly limited; however, it is desirably in a range from about 1.0 to about 2.0.

If the ratio (b/t) of cell wall thickness is about 1.0 or more, the strength of the inner honeycomb fired body itself is unlikely to be decreased. On the other hand, when the ratio (b/t) of cell wall thickness is about 2.0 or less, the surface area of the cells capable of capturing particulate is unlikely to be decreased, and the amount of captured particulate (accumulation amount) of the particulate itself is unlikely to be decreased. This may substantially prevent decrease of exhaust gas purifying efficiency of the honeycomb filter.

In the inner honeycomb fired bodies, the thickness of the outer walls is desirably in a range from about 0.20 to about 0.45 mm.

If the thickness of the outer walls is about 0.20 mm or more, it becomes easier to obtain the effect of accumulating a larger amount of particulate in the inner part of the honeycomb filter. On the other hand, if the thickness of the outer walls is about 0.45 mm or less, the surface area of the cells capable of capturing particulate is unlikely to be reduced and the amount (accumulation amount) of the captured particulate itself is unlikely to be decreased. Accordingly, the exhaust gas purifying efficiency of the honeycomb filter is unlikely to be decreased. Further, in the inner honeycomb fired bodies, it is desirable to satisfy the ratio (b/t) of cell wall thickness and the thickness of the outer walls is within the aforementioned range. This is because, the strength of the honeycomb filter may easily be maintained and at the same time the flow of the exhaust gas can be efficiently controlled so that further improvement of the particulate combustion efficiency.

In the honeycomb filter according to the embodiment of the present invention, the outer walls of the outer peripheral honeycomb fired bodies may be of any thickness as long as they are thicker than the outer walls of the inner honeycomb fired bodies, and the thicknesses of the outer walls of the plurality of the outer peripheral honeycomb fired bodies may be same or different; however, the thickness is desirably the same with one another.

The ratio of the total cross-sectional surface area of the thick-wall honeycomb fired bodies to the cross-sectional surface area of a cross-section perpendicular to the longitudinal direction of the honeycomb filter according to the embodiment of the present invention is not particularly limited as long as at least one of the outer peripheral honeycomb fired bodies is a thick-wall honeycomb fired body; however, the ratio is preferably in a range from about 20 to about 60%.

Another embodiment of the honeycomb filter of the present invention will be described with reference to FIG. 2(a) and FIG. 2(b).

Figure 2A:
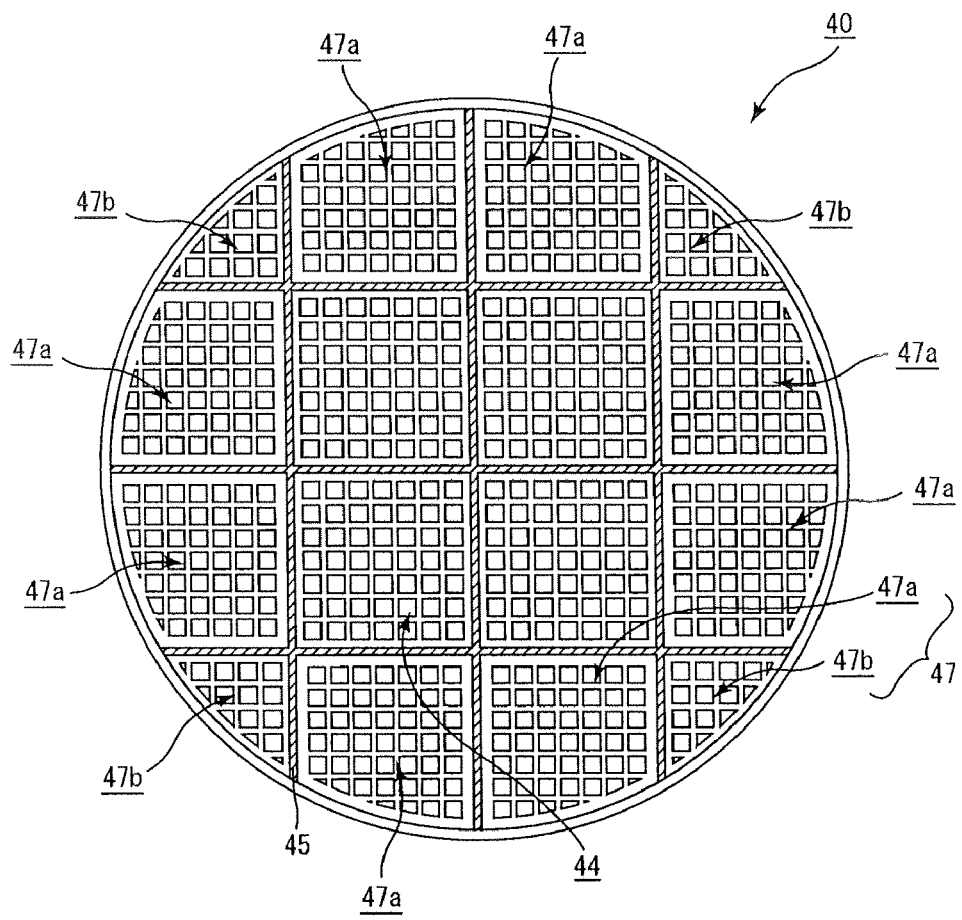
FIG. 2(a) is a schematic front view of another embodiment of a honeycomb filter of the present invention.
Figure 2B:
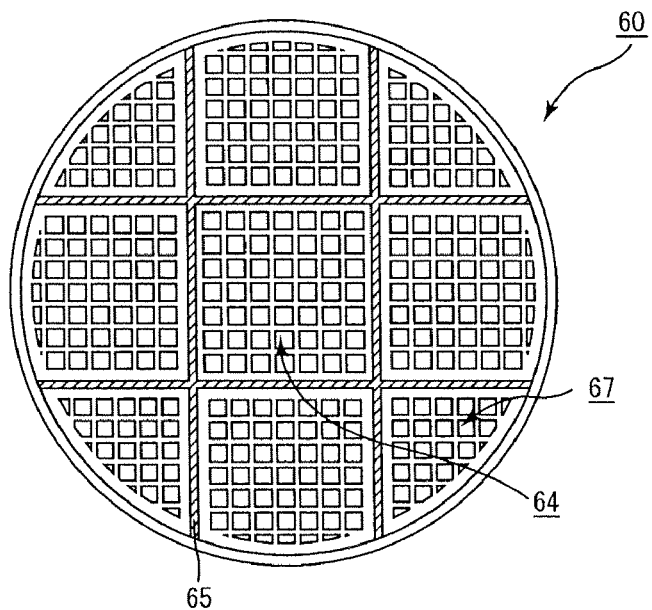
FIG. 2(b) is a schematic front view of yet another embodiment of the honeycomb filter of the present invention.
Figure 3:
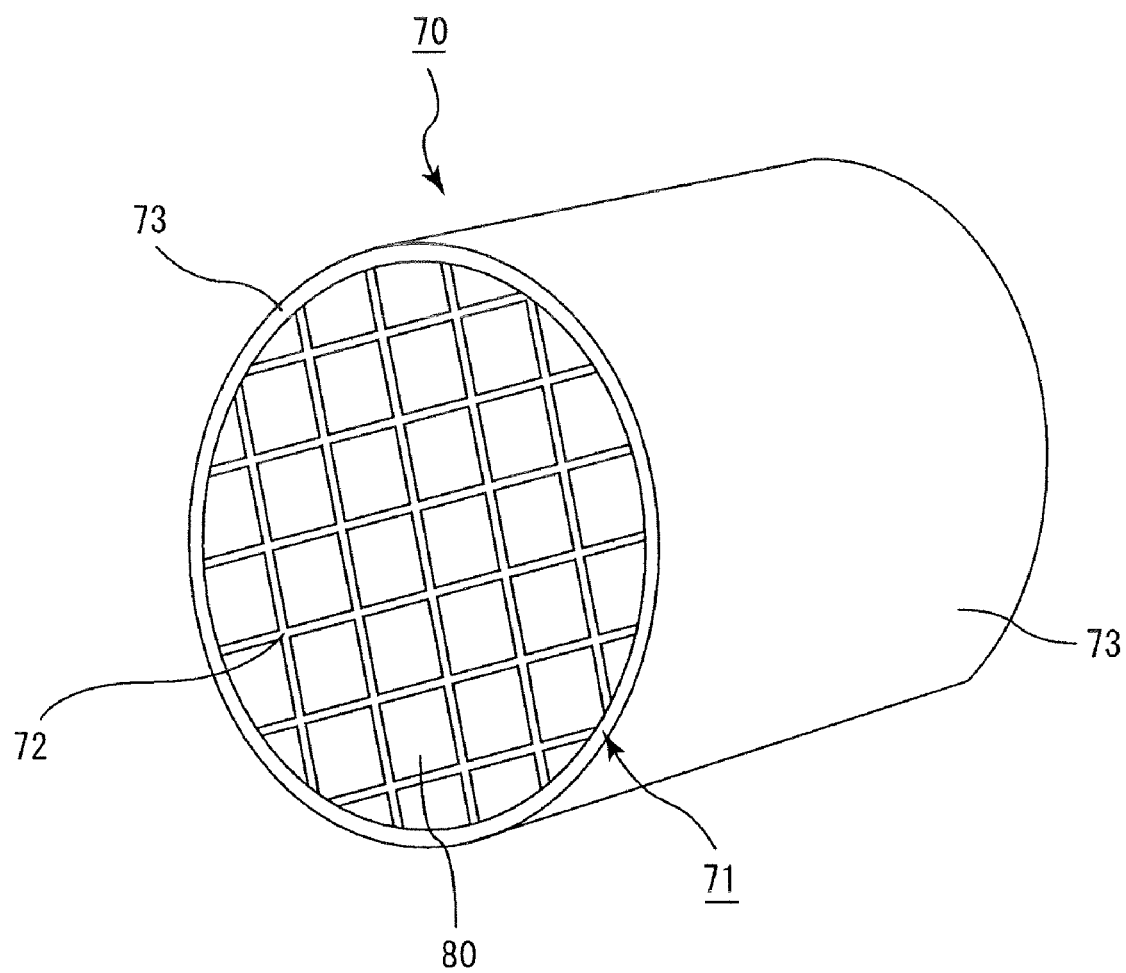
FIG. 3 is a perspective view schematically showing one example of a conventional honeycomb filter.
Figure 4A:
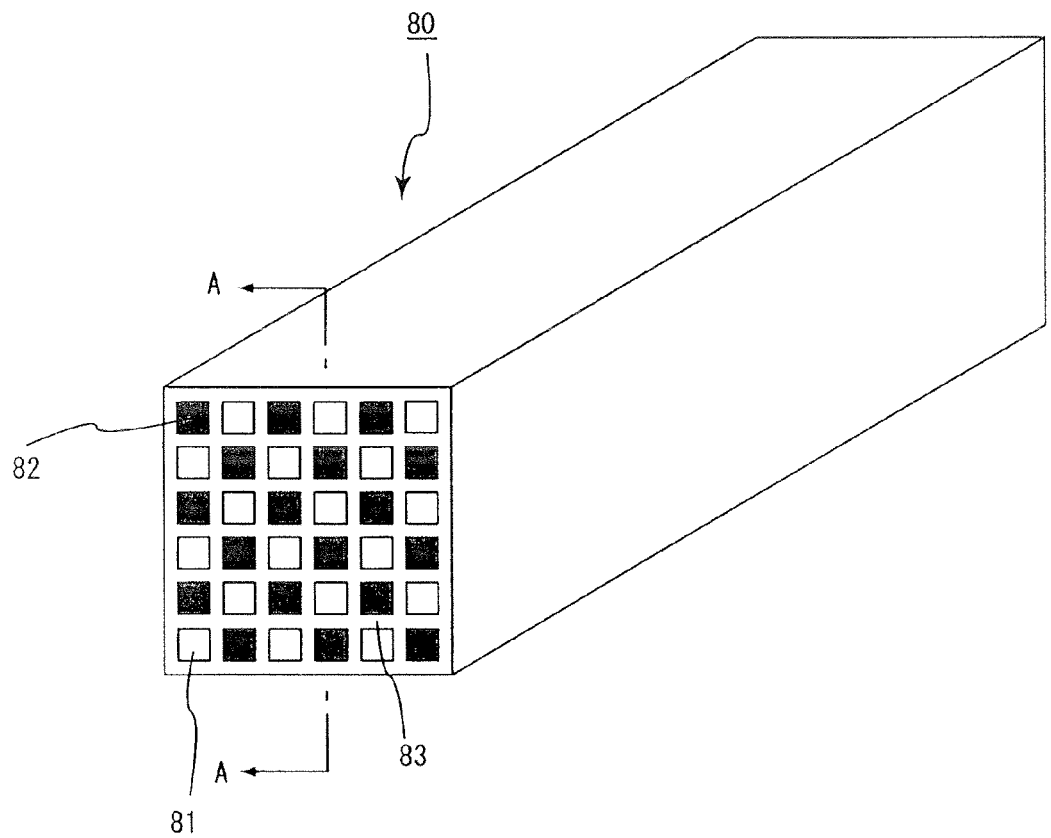
FIG. 4(a) is a perspective view schematically showing a honeycomb fired body composing a conventional honeycomb filter and FIG. 4(b) is a cross-sectional view taken along the A-A line of FIG. 4(a).
Figure 4B:
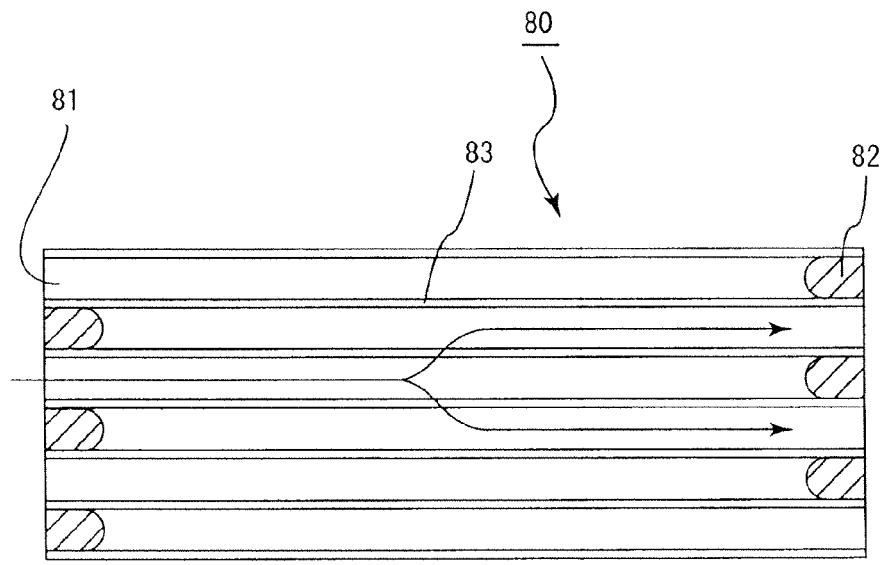

FIG. 2(a) is a front view schematically showing another embodiment of the honeycomb filter of the present invention and FIG. 2(b) is a front view schematically showing another different embodiment of the honeycomb filter of the present invention.

In a honeycomb filter 40 shown in FIG. 2(a), inner honeycomb fired bodies 44 and outer peripheral honeycomb fired bodies 47 are bonded to each other by interposing an adhesive material layers 45. In the honeycomb filter 40, thick-wall honeycomb fired bodies 47a and equal-thickness honeycomb fired bodies 47b are present as the outer peripheral honeycomb fired bodies 47. In the honeycomb filter 40, honeycomb fired bodies are arranged in 4 rows and 4 columns, that is, there are twelve pieces of outer peripheral honeycomb fired bodies 47 and four pieces of inner honeycomb fired bodies 44. Among the outer peripheral honeycomb fired bodies 47, eight pieces of thick-wall honeycomb fired bodies 47a and four pieces of equal-thickness honeycomb fired bodies 47b exist.

The honeycomb filter 40 having the aforementioned configuration is also within the scope of the present invention, and is provided with the effects of the present invention.

Further, with respect to a honeycomb filter 60 shown in FIG. 2(b), honeycomb fired bodies are arranged in 3 rows and 3 columns, that is, there are eight pieces of outer peripheral honeycomb fired bodies 67 and one inner honeycomb fired body 64. In the honeycomb filter 60, all the outer peripheral honeycomb fired bodies 67 are thick-wall honeycomb fired bodies. The honeycomb filter 60 having aforementioned configuration is also included within the scope of the present invention, and is provided with the effects of the present invention.

Further, the embodiments illustrated in the drawings are of those of the embodiments of the present invention, and therefore the present invention is not limited to the exemplified embodiments illustrated in the drawings.

The assembly embodiment of the honeycomb fired bodies composing the honeycomb filter are not particularly limited, and may include, as described above, 3 rows and 3 columns, or 4 rows and 4 columns, and furthermore, those other than the aforementioned configurations, for example, 4 rows and 3 columns, 6 rows and 6 columns, and the like may also be included. In any assembled configuration, as long as at least one of the outer peripheral honeycomb fired bodies composing the honeycomb filter is a thick-wall honeycomb fired body, the effects of the present invention can be obtained.

In the honeycomb fired bodies according to the embodiment of the present invention, the aperture ratio of the cells in a cross-section perpendicular to the longitudinal direction is desirably about 55% or more.

When the aperture ratio is about 55% or more, the pressure loss of the honeycomb filter is unlikely to become high.

The more desirable lower limit is about 60% and still more desirable lower limit is about 65%.

Herein, the aperture ratio of the cells means the ratio occupied by cells in the cross-section perpendicular to the longitudinal direction of the honeycomb fired body. Incidentally, the cross-section perpendicular to the longitudinal direction refers to a cross-section that is not sealed by a plug.

The honeycomb fired body mainly includes a porous ceramic, and examples of materials therefore include nitride ceramics such as aluminum nitride, silicon nitride, boron nitride, and titanium nitride; carbide ceramics such as silicon carbide, zirconium carbide, titanium carbide, tantalum carbide, and tungsten carbide; and oxide ceramics such as alumina, zirconia, cordierite, mullite, silica, and aluminum titanate, and the like. Further, the honeycomb fired bodies may be formed of silicon carbide base ceramics or a composite of silicon and silicon carbide. In the case where the composite of silicon and silicon carbide is employed, it is desirable to add silicon in an amount of about 5 to about 45% by weight of the entire body.

The material of the honeycomb fired bodies is desirably silicon carbide base ceramics or a composite of silicon and silicon carbide that have high heat resistance, excellent mechanical properties, and high heat conductivity. The silicon carbide base ceramics are those which contain about 60% by weight or more of silicon carbide.

The average pore diameter of the honeycomb fired bodies is not particularly limited; however, the lower limit is desirably about 1 $\mu$m, and the upper limit is desirably about 50 $\mu$m. Further, the lower limit is more desirably about 5 $\mu$m, and the upper limit is more desirably about 30 $\mu$m. When the average pore diameter is 1 $\mu$m or more, the pressure loss is unlikely to be increased and, on the other hand, when the average pore diameter is about 50 $\mu$m or less, the particulate does not tend to easily pass through the pores and thus the particulate may easily be sufficiently captured, substantially preventing decrease in the particulate capturing efficiency.

The porosity of the honeycomb fired bodies is not particularly limited; however, the lower limit is desirably about 40%, and the upper limit is desirably about 60%. Further, the lower limit is more desirably about 45% and the upper limit is more desirably about 55%. When the porosity is about 40% or more, the pores of the honeycomb filter does not tend to be clogged. On the other hand, when the porosity is about 60% or less, the strength of the honeycomb filter does not tend to become too low to be easily broken.

The porosity may be measured by a conventionally known method such as mercury porosimetry, Archimedes' method, and measurement through a scanning electron microscopy (SEM).

The cross-sectional surface area of a cross-section perpendicular to the longitudinal direction of the honeycomb fired bodies is not particularly limited; however, it is desirably in a range from about 5 to about 50 $cm^2$.

When the cross-sectional surface area is about 5 $cm^2$ or more, the aperture ratio in the entire body of the filter is unlikely to be too low to lead to deterioration of the exhaust gas purification capacity. On the other hand, when the cross-sectional surface area is about 50 $cm^2$ or less, at the time of production or use, damages such as cracks do not tend to be caused due to the thermal stress.

The plug for sealing the end parts of the cells of the honeycomb fired bodies and the cell walls desirably include the same porous ceramic. With this arrangement, adhesion strength between the plug and the cell walls may easily be increased, and further, by adjusting the porosity of the plug to be almost the same as the porosity of the cell walls, the thermal expansion coefficient of the cell walls and the thermal expansion coefficient of the plug may be conformed each other so that formation of gaps between the plug and cell walls due to the thermal stress at the time of production or use may substantially be prevented, and crack formation in the plug or portions of cell walls which have contact with the plug can be also prevented.

In the honeycomb filter according to the embodiment of the present invention, adhesive material layers are formed between the honeycomb fired bodies, and desirably have a function of preventing exhaust gas leakage. On the other hand, the sealing material layer (coat layer) is formed on the outer peripheral face of the ceramic block including a plurality of the bonded honeycomb fired bodies, and functions as a seal for preventing leakage of an exhaust gas passing through the cells from the outer peripheral face of the ceramic block, when the honeycomb filter is installed in an exhaust path of an internal combustion engine. Further, the sealing material layer (coat layer) also functions as a reinforcing material for keeping the outer shape of the ceramic block well and reinforcing the outer peripheral part.

In the honeycomb filter according to the embodiment of the present invention, the adhesive material layer and the coat layer may include the same material or may respectively include different materials. Further, in the case the adhesive material layer and the coat layer include the same material, the mixing ratio of the material may be the same or different. Further, the material may be a dense material or a porous material.

The material composing the adhesive material layer and the coat layer is not particularly limited, and those containing an inorganic binder and an organic binder in combination with inorganic fibers and/or inorganic particles can be exemplified.

Examples of the inorganic binder include silica sol, alumina sol, and the like, They may be used alone or two or more of them may be used in combination. Among the inorganic binders, silica is desirable.

Examples of the organic binder include polyvinyl alcohol, methyl cellulose, ethyl cellulose, carboxymethyl cellulose, and the like. They may be used alone or two or more of them may be used in combination. Among the organic binders, carboxymethyl cellulose is desirable.

Examples of the inorganic fibers include silica-alumina ceramic fibers, mullite fibers, alumina fibers, silica fibers, and the like. They may be used alone or two or more of them may be used in combination. Among the inorganic fibers, alumina fibers are desirable.

Examples of the inorganic particles include carbides, nitrides, and the like. Specifically, inorganic powders including silicon carbide, silicon nitride, boron nitride, and the like may be exemplified. Among the aforementioned inorganic particles, silicon carbide having excellent thermal conductivity is desirable.

Further, a paste to be used for forming the sealing material layer may contain, if necessary, a pore-forming agent such as balloons, very small hollow spherical bodies, containing oxide base ceramics as a component; spherical acrylic particles, and graphite.

The balloons are not particularly limited, and examples thereof may include alumina balloons, glass micro-balloons, shirasu balloons, fly ash balloons (FA balloons), mullite balloons and the like, although not particularly limited thereto. Among these, alumina balloons are more desirably used.

The honeycomb filter according to the embodiment of the present invention may support a catalyst.

In the honeycomb filter according to the embodiment of the present invention, a catalyst for assisting combustion of the particulate may be supported so that the particulate is more easily burned and removed. Further, a catalyst capable of converting harmful gaseous components in an exhaust gas such as CO, HC, and $NO_x$ may be supported so that the harmful gaseous components generated by combustion of the particulate can be also converted sufficiently by catalytic reaction.

The catalyst is not particularly limited, and examples thereof include a catalyst including a noble metal such as platinum, palladium, and rhodium. Further, in addition to these noble metals, alkali metals (Group 1 in Element Periodic Table), alkaline earth metals (Group 2 in Element Periodic Table), rare earth metals (Group 3 in Element Periodic Table), a transition metal, and the like may also be supported.

At the time of supporting the catalyst on the honeycomb filter according to the embodiment of the present invention, it is desirable that the catalyst is supported after coating the surface of the honeycomb filter in advance with a catalyst supporting layer of alumina or the like. Accordingly, the specific surface area can be increased and the degree of dispersion of the catalyst is increased and the reaction sites of the catalyst may be increased.

Further, due to the catalyst supporting layer, it is possible to prevent sintering of the catalyst metal.

Examples of the catalyst supporting layer include oxide ceramics such as alumina, titania, zirconia, and silica.

Next, a method for manufacturing the honeycomb filter according to the embodiment of the present invention will be described.

In the method for manufacturing the honeycomb filter according to the embodiment of the present invention, a honeycomb molded body manufacturing process for manufacturing plural kinds of honeycomb molded bodies is carried out by preparing a mixture composition containing a ceramic a main component, and extrusion molding the mixture composition.

The mixture composition is not particularly limited; however, those which can give a honeycomb filter with about 40 to about 60% porosity after manufacturing is desirably used, and examples thereof include those obtained by mixing a ceramic powder, a binder, and a dispersion liquid.

The ceramic powder is not particularly limited and examples thereof include powders of oxide ceramic such as cordierite, alumina, silica, mullite, and aluminum titanate; powders of carbide ceramics such as silicon carbide, zirconium carbide, titanium carbide, tantalum carbide, and tungsten carbide; and powders of nitride ceramic such as aluminum nitride, silicon nitride, boron nitride, and titanium nitride, and the like. Among them, silicon carbide is preferable since it has high heat resistance, excellent mechanical properties, and also high thermal conductivity.

The particle diameter of the ceramic powder is not particularly limited; however, those which exhibit little shrinkage in the post-process of firing are preferable and, for example, a combination of 100 parts by weight of a powder having an average particle diameter of about 1 to about 50 μm and about 5 to about 65 parts by weight of a powder with an average particle diameter of about 0.1 to about 1.0 μm is preferable.

The binder is not particularly limited, and examples thereof include methyl cellulose, carboxymethyl cellulose, hydroxyethyl cellulose, polyethylene glycol and the like.

The addition amount of the binder is not particularly limited; however, it is preferably in a range from about 1 to about 10 parts by weight relative to 100 parts by weight of the ceramic powder.

The dispersion liquid is not particularly limited, and examples thereof include organic solvents such as benzene, alcohols such as methanol, water, and the like. The dispersion liquid is properly added in a manner that the viscosity of the mixture composition be set in a specified range.

These ceramic powder, binder, dispersion medium liquid, and the like are mixed by an attriter and sufficiently kneaded so that the mixture composition can be prepared.

The mixture composition is extrusion molded to give a pillar-shaped molded body with a predetermined cross-sectional shape having a plurality of cells longitudinally placed in parallel with one another with a cell wall therebetween, and the molded body is cut into a predetermined length, thereby a honeycomb molded body is manufactured.

In the present process, plural kinds of honeycomb molded bodies with different shapes are manufactured by using plural kinds of extrusion molding dies with different shapes. Practically, the honeycomb molded body preferably has a shape formed by eliminating a portion of a rectangular pillar and forming a curved face in the portion, or has a rectangular pillar shape.

In the method for manufacturing the honeycomb filter according to the embodiment of the present invention, the honeycomb molded body to be manufactured in the honeycomb molded body manufacturing method may be properly determined in consideration of the shape and the size (diameter or length of the cross-section) of the aimed honeycomb filter. For manufacturing of the honeycomb molded body of this kind, a ceramic material is extrusion molded by using a die having the desired cross-sectional shape as the die for extrusion molding so that the honeycomb molded body having a predetermined shape can be manufactured.

Next, the honeycomb molded body is dried by using a microwave drying apparatus, a hot air drying apparatus, an induction drying apparatus, a reduced pressure drying apparatus, a vacuum drying apparatus, a freeze drying apparatus and the like, and thereafter predetermined cells are filled in with a plug material paste to carry out sealing process for sealing those cells.

Additionally, the honeycomb molded body after drying is allowed to contain a small amount of dispersion medium.

Next, the dried honeycomb molded body filled in with the plug material paste is heated to about 150 to about 700° C. to remove the binder contained in the dried honeycomb molded body and degreasing treatment is carried out to give a degreased honeycomb molded body.

The firing process for manufacturing a honeycomb fired body is performed in such a manner that the degreased honeycomb molded body is fired by heating at about 2000 to about 2200° C. in an atmosphere of an inert gas such as nitrogen and argon to sinter the ceramic powder.

In the method for manufacturing the honeycomb filter according to the embodiment of the invention, plural kinds of honeycomb fired bodies having predetermined cross-sectional shapes are manufactured via the firing process.

Next, a ceramic block production process is carried out to manufacture a ceramic block with a cylindrical shape, cylindroid shape, or a shape similar to these shapes, by combining plural kinds of honeycomb fired bodies by interposing an adhesive paste therebetween.

In this ceramic block production process, the adhesive material paste is applied to the side faces of a honeycomb fired body using a brush, a squeegee, a roll, a dispenser, or the like to form an adhesive material paste layer with a prescribed thickness.

After the adhesive material paste layer is formed, processes of successively bonding other honeycomb fired bodies are repeated to manufacture an aggregated body of honeycomb fired bodies with a predetermined size and shape.

Next, the aggregated body of the honeycomb fired bodies produced in the aforementioned manner is heated, for example, at about 50 to about 150° C. for about one hour to dry and harden the adhesive material paste, thereby a ceramic block is manufactured.

In the method for manufacturing the honeycomb filter according to the embodiment of the present invention, after the ceramic block is manufactured, a coating material paste is further spread over the outer peripheral part of the ceramic block to form a coating material paste layer and, thereafter, the coating material paste layer may be dried, for example, at a temperature of about 120° C. or more to evaporate water and the like, so that the sealing material (coat layer) may be formed on the outer peripheral part of the ceramic block.

In a conventional honeycomb filter, there is no difference in the thickness of the cell walls of a honeycomb fired body and a honeycomb fired body having cell walls of the same thickness is employed. When a honeycomb filter using such a honeycomb fired body is installed in an exhaust path, the particulate begins accumulating firstly at the inner part of the honeycomb filter where the exhaust gas is relatively easy to flow in. Thereafter, the accumulation of the particulate is spread toward the outer peripheral part and finally the particulate is accumulated almost uniformly in the outer peripheral part and inner part.

When the particulate accumulation reaches a prescribed amount, regeneration process of the honeycomb filter is carried out in order to burn and remove the accumulated particulate. In this regeneration process, a high temperature gas flows in the honeycomb filter to burn and remove the particulate. At that time, similarly to the accumulation of the particulate starting from the inner part, the combustion of the particulate starts from at the inner part. Thereafter, ideally the combustion of the particulate is spread toward the outer peripheral part and finally the particulate is burned and removed from the entire honeycomb filter to complete the regeneration process.

However, in the case of conventional honeycomb filters, due to the combustion of the particulate starting from the inner part, the inner part alone reaches a high temperature state and the combustion of the particulate in the inner part is promoted. Accordingly, before the outer peripheral part reaches a sufficiently high temperature for combustion of the particulate, the combustion of the particulate accumulated in the inner part is completed so that a high temperature gas tends to more easily flow into the inner part where the particulate combustion is completed and the cell walls are provided with high permeability. On the other hand, since the outer peripheral part into which the high temperature gas tends not to flow in cannot reach the sufficiently high temperature state for combustion of the particulate, the particulate is burned insufficiently and may remain even after the regeneration process.

The embodiment of the present invention can provide a honeycomb filter that keeps strength against thermal stress at the time of use, and may easily burn and remove the particulate sufficiently at the time of regeneration process of the filter and may also efficiently suppress increase of the pressure loss.

EXAMPLES

The present invention will be described more in detail along with Examples; however it is not intended that the present invention be limited to the illustrated descriptions.

Example 1

A coarse powder (52.2% by weight) of silicon carbide with an average particle diameter of 22 μm and 22.4% by weight of a fine powder of silicon carbide with an average particle diameter of 0.5 μm are wet mixed, and 4.8% by weight of an acrylic resin, 2.6% by weight of an organic binder (methyl cellulose), 2.9% by weight of a lubricant (UNILUBE, manufactured by NOF Corp.), 1.3% by weight of glycerin, and 13.8% by weight of water were added to the mixture and kneaded to obtain a mixture composition, and then extrusion molding is carried out so that a honeycomb molded body was manufactured.

Next, the honeycomb molded body was dried using a microwave drying apparatus to obtain a ceramic dried body and, thereafter, a plug material paste with the same composition of the composition of the honeycomb molded body is filled into the predetermined cells.

Next, the honeycomb molded bodies were dried again using a drying apparatus and degreased at 400° C. and then fired at 2200° C. in argon atmosphere under a normal pressure for three hours so that outer peripheral honeycomb fired bodies and inner honeycomb fired bodies were manufactured. The inner honeycomb fired bodies had a porosity of 47.5%, an average pore diameter of 12.5 μm, a size of 34.3 mm×34.3 mm×150 mm, and the number of the cells (cell density) of 46.5 pcs/cm$^2$. The outer peripheral honeycomb fired bodies were made to have different shapes and sizes. The thicknesses of the cell walls of the outer peripheral honeycomb fired bodies and the inner honeycomb fired bodies are as shown in Table 2. Table 2 also shows the ratio (a/b) of the thickness (a) of the outer wall of the thick-wall honeycomb fired bodies to the thickness (b) of the outer walls of the inner honeycomb fired bodies.

Next, using a heat resistant adhesive material paste containing 30% by weight of alumina fibers with an average fiber length of 20 μm, 21% by weight of silicon carbide particles with an average particle diameter of 0.6 μm, 15% by weight of silica sol, 5.6% by weight of carboxymethyl cellulose, and 28.4% by weight of water, as shown in FIG. 1, twelve pieces of the outer peripheral honeycomb fired bodies and four pieces of the inner honeycomb fired bodies were bonded together, and further dried at 120° C. so as to manufacture a cylindrical-shaped ceramic block in which the adhesive material layer has a thickness of 1 mm.

Successively, using a sealing material paste with the same composition as that of the adhesive material paste, a 0.2 mm-thick sealing material paste layer was formed on the outer peripheral part of the ceramic block. The sealing material paste layer was dried at 120° C. to manufacture a cylindrical-shaped aggregated honeycomb filter having a size of 143.8 mm in diameter×150 mm in length.

Examples 2 to 10

Honeycomb filters were manufactured in the same manner as Example 1, except that the thicknesses (a) of the outer walls of the outer peripheral honeycomb fired bodies, the thicknesses (b) of the outer walls of the inner honeycomb fired bodies, and the thicknesses of the inner cell walls were changed to the values shown in Table 2.

Comparative Examples 1 to 5

Honeycomb filters were manufactured in the same manner as Example 1, except that the thicknesses (a) of the outer walls of the outer peripheral honeycomb fired bodies and the thicknesses (b) of the outer walls of the inner honeycomb fired bodies were set to the same value, and additionally the thickness of each of the inner cell walls were changed to the values shown in Table 2.

The regeneration rate (%) was calculated from the weight of the particulate (PM) after the regeneration according to the following equation (i):

Regeneration rate (%)=($PM$ weight before regeneration–$PM$ weight after regeneration)/($PM$ weight before regeneration)×100     (i)

Figure 6:
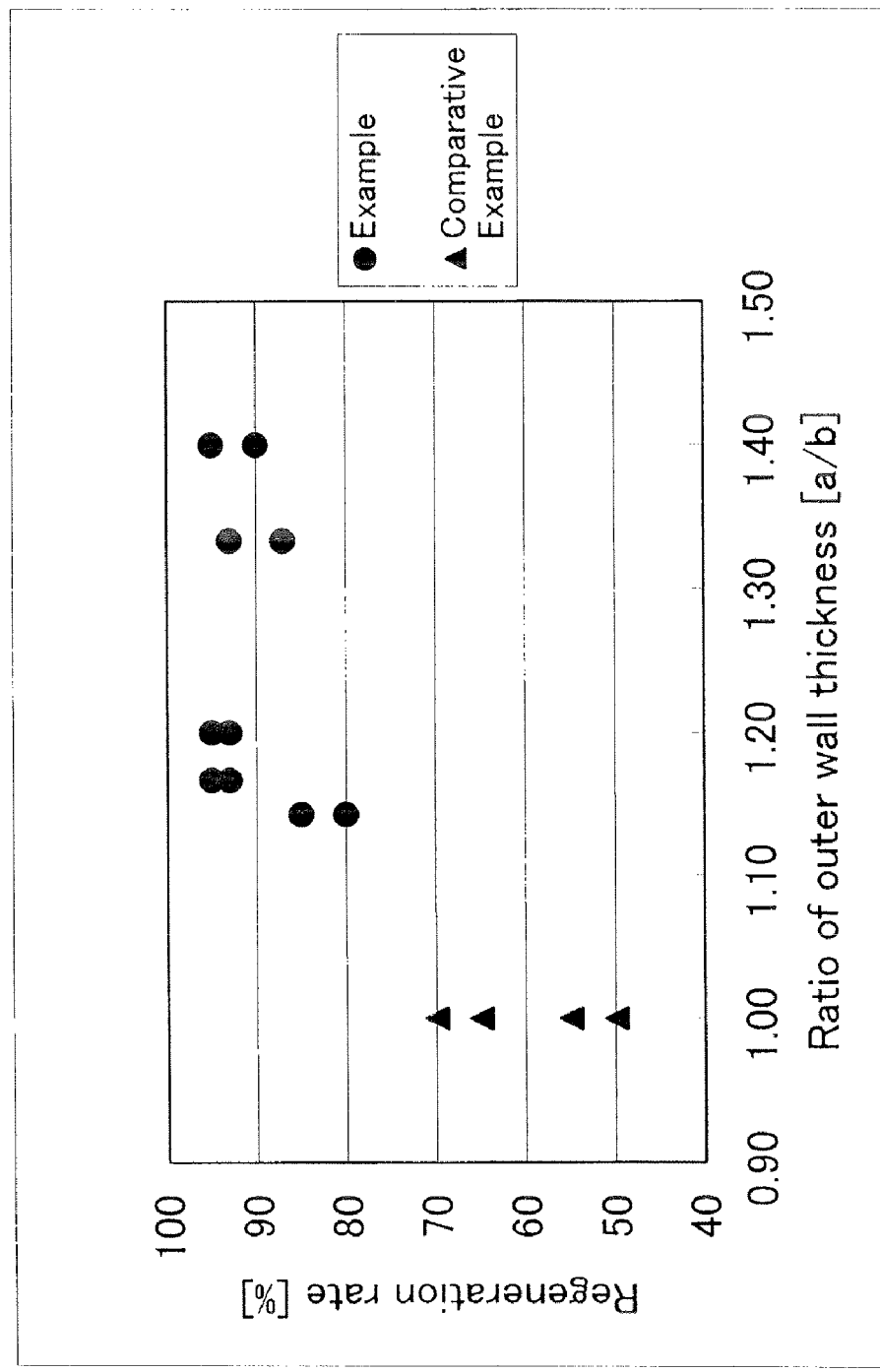
FIG. 6 is an explanatory diagram showing the results of the regeneration rate measurement performed in Examples and Comparative Examples.

The results are shown in Table 2 and FIG. 6. FIG. 6 is an explanatory graph showing the results of the regeneration rate measurement test carried out in Examples and Comparative Examples.

TABLE 2

| Honeycomb fired body Cell wall thickness | Outer periphery honeycomb fired body Inner honeycomb fired body Inner cell wall thickness (mm) | Inner honeycomb fired body Outer wall thickness (b) (mm) | Outer periphery honeycomb fired body (=Thick-wall honeycomb fired body) Outer wall thickness (a) (mm) | Ratio of outer wall thickness (a/b) | Regeneration rate (%) |
|---|---|---|---|---|---|
| Example 1 | 0.25 | 0.30 | 0.35 | 1.17 | 95 |
| Example 2 | 0.25 | 0.30 | 0.40 | 1.33 | 93 |
| Example 3 | 0.25 | 0.25 | 0.30 | 1.20 | 93 |
| Example 4 | 0.25 | 0.25 | 0.35 | 1.40 | 95 |
| Example 5 | 0.20 | 0.25 | 0.30 | 1.20 | 95 |
| Example 6 | 0.20 | 0.25 | 0.35 | 1.40 | 90 |
| Example 7 | 0.20 | 0.30 | 0.35 | 1.17 | 93 |
| Example 8 | 0.20 | 0.30 | 0.40 | 1.33 | 87 |
| Example 9 | 0.30 | 0.35 | 0.40 | 1.14 | 85 |
| Example 10 | 0.35 | 0.35 | 0.40 | 1.14 | 80 |
| Comparative Example 1 | 0.25 | 0.30 | 0.30 | 1.00 | 65 |
| Comparative Example 2 | 0.25 | 0.25 | 0.25 | 1.00 | 55 |
| Comparative Example 3 | 0.20 | 0.25 | 0.25 | 1.00 | 65 |
| Comparative Example 4 | 0.20 | 0.30 | 0.30 | 1.00 | 70 |
| Comparative Example 5 | 0.35 | 0.35 | 0.35 | 1.00 | 50 |

(Evaluation of Honeycomb Filter)

(Regeneration Rate Measurement)

Figure 5:
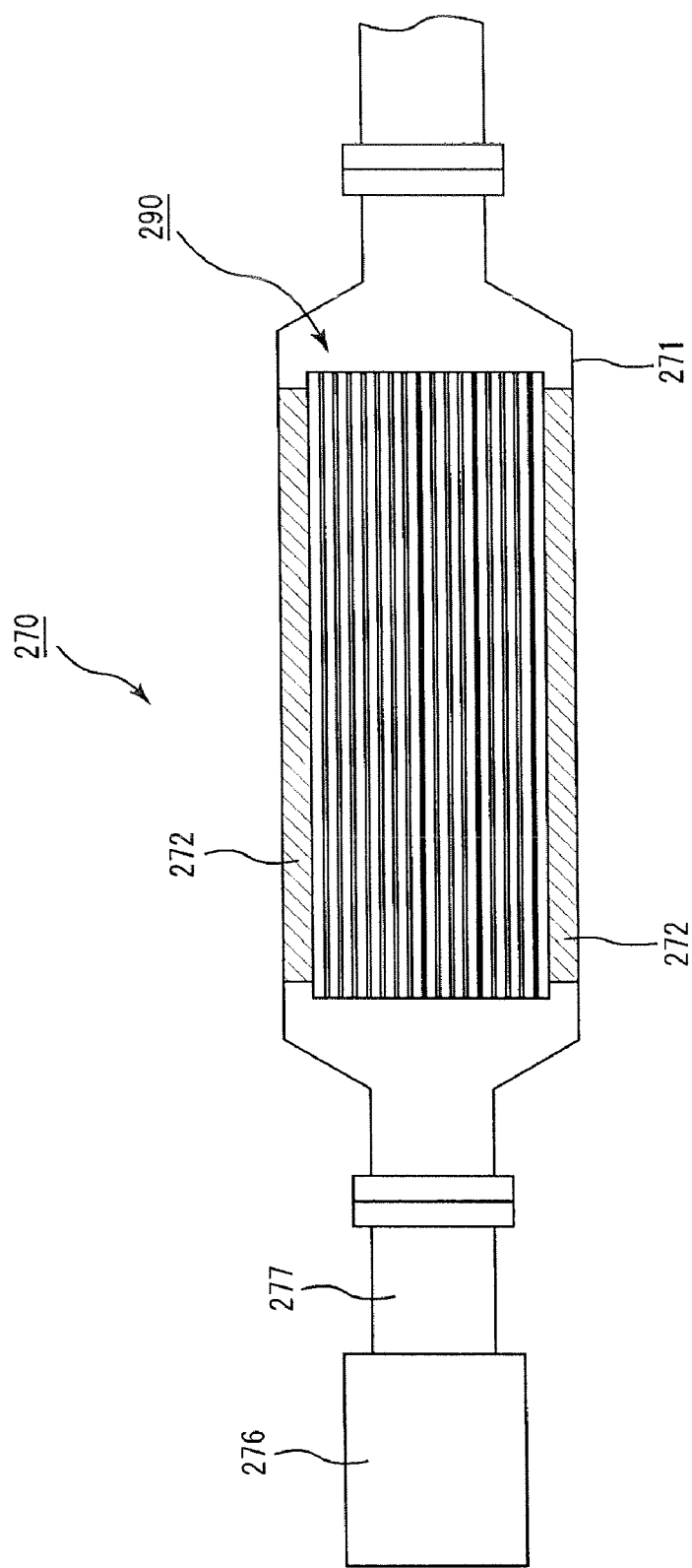
FIG. 5 is a schematic view of a test apparatus for regeneration rate measurement.

The regeneration rate of each of the honeycomb filters manufactured in Examples and Comparative Examples was measured. Specifically, the regeneration rate of each honeycomb filter was measured using a test apparatus shown in FIG. 5. FIG. 5 shows a schematic drawing of the test apparatus for regeneration rate measurement.

A test apparatus 270 for measuring the regeneration rate includes a 2 L common rail type diesel engine 276, an exhaust gas pipe 277 for passing an exhaust gas from the engine 276, and a metal casing 271 connected to the exhaust gas pipe 277 and composing a portion of the exhaust gas pipe 277. Each honeycomb filter 290 on which a 5 mm-thick mat 272 made of ceramic fibers was wrapped was fixed in the metal casing 271.

In the measurement procedure, at first, the honeycomb filter 290 was weighed in a state that no particulate was deposited.

Next, the engine 276 was driven for a predetermined period of time at a rotation speed of 2000 min$^{-1}$ and torque of 40 Nm to deposit 8 g/L particulate on the honeycomb filter 290. At this point, the honeycomb filter 290 was once taken out and weighed.

After that, the engine 276 was driven for 5 minutes in a post-injection method to carry out regeneration process of the honeycomb filter 290 and the honeycomb filter 290 was weighed after the regeneration process.

As apparent from the results shown in Table 2 and FIG. 6, the honeycomb filters manufactured in Examples had a high regeneration rate of 80% or more. That is supposedly attributed to that in the case of the honeycomb filters manufactured in Examples, since the outer peripheral honeycomb fired bodies were all thick-wall honeycomb fired bodies, the exhaust gas flow was controlled to come into the inner parts of the honeycomb filters so that the deposition amounts of the particulate were adjusted to be proper at the inner parts and the outer peripheral parts.

On the other hand, in the case of the honeycomb filters manufactured in Comparative Examples, it was found that the regeneration rate was as low as 70% or less, and that the particulate deposited on the honeycomb filters was not sufficiently burned and removed. This was supposedly attributed to that, since the particulate was deposited approximately evenly on the inner parts and outer peripheral parts in the honeycomb filters produced in Comparative Examples, the particulate combustion was promoted only in the inner parts where the temperature tends to be high, whereas the outer peripheral parts was not supplied with enough heat for sufficiently burning and removing the deposited particulate.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A honeycomb filter comprising:
   a plurality of honeycomb fired bodies each having a longitudinal direction and a plurality of cells which are divided by cell walls and which extend in the longitudinal direction in substantially parallel with each other, each of the cells having one end sealed; and
   an adhesive material binding the plurality of honeycomb fired bodies, said plurality of honeycomb fired bodies comprising:
      outer peripheral honeycomb fired bodies each having a first outer wall and positioned at an outermost periphery of the honeycomb filter; and
      inner honeycomb fired bodies surrounded by the outer peripheral honeycomb fired bodies, each of the inner honeycomb fired bodies having a second outer wall thinner than the first outer wall.

2. The honeycomb filter according to claim 1, wherein a thickness of the second outer wall of each of said inner honeycomb fired bodies is equal to or more than a thickness of each of the cell walls.

3. The honeycomb filter according to claim 1, wherein all of the first outer walls of said outer peripheral honeycomb fired bodies are thicker than the second outer walls of said inner honeycomb fired bodies.

4. The honeycomb filter according to claim 1, wherein a ratio of a thickness of the first outer wall to a thickness of the second outer wall is in a range from about 1.05 to about 2.0.

5. The honeycomb filter according to claim 1, wherein thickness of the first outer wall is in a range from about 0.25 to about 0.50 mm.

6. The honeycomb filter according to claim 1, wherein a ratio of a thickness of the second outer wall to a thickness of the cell walls is in a range from about 1.0 to about 2.0.

7. The honeycomb filter according to claim 1, wherein a thickness of the second outer wall is in a range from about 0.20 to about 0.45 mm.

8. The honeycomb filter according to claim 1, wherein the first outer walls have a substantially uniform thickness.

9. The honeycomb filter according to claim 1, wherein a ratio of a cross-sectional area of the outer peripheral honeycomb fired bodies to a cross-sectional area of the honeycomb filter in a cross section perpendicular to the longitudinal direction is in a range from about 20% to about 60%.

* * * * *